(12) United States Patent
Nakamura et al.

(10) Patent No.: US 12,011,006 B2
(45) Date of Patent: Jun. 18, 2024

(54) STICK TURNING DEVICE FOR STICK ON WHICH CHAIN OF SAUSAGES IS SUSPENDED

(71) Applicant: HITEC CO., LTD., Yokohama (JP)

(72) Inventors: Tatsuo Nakamura, Yokohama (JP); Hideaki Oikawa, Yokohama (JP)

(73) Assignee: HITEC CO., LTD., Yokohama (JP)

( * ) Notice: Subject to any disclaimer, the term of this patent is extended or adjusted under 35 U.S.C. 154(b) by 122 days.

(21) Appl. No.: 17/897,425

(22) Filed: Aug. 29, 2022

(65) Prior Publication Data

US 2023/0068141 A1 Mar. 2, 2023

(30) Foreign Application Priority Data

Sep. 1, 2021 (JP) ................................ 2021-142673

(51) Int. Cl.
*A22C 15/00* (2006.01)
(52) U.S. Cl.
CPC .................................. *A22C 15/001* (2013.01)
(58) Field of Classification Search
CPC .................................................... A22C 15/001
USPC ....................... 452/30–32, 35–37, 46–48, 51
See application file for complete search history.

(56) References Cited

U.S. PATENT DOCUMENTS

| 7,040,975 B2* | 5/2006 | Shefet | A22C 11/127 452/51 |
| 7,588,485 B1* | 9/2009 | Nakamura | A22C 15/001 452/51 |
| 7,735,630 B2* | 6/2010 | Borkiewicz | A22C 15/001 198/465.4 |
| 8,708,782 B2* | 4/2014 | Kessler | A22C 15/001 452/51 |

FOREIGN PATENT DOCUMENTS

| EP | 2 868 203 A1 | 5/2015 |
| WO | WO 2019/239737 A1 | 12/2019 |

* cited by examiner

*Primary Examiner* — Richard T Price, Jr.
(74) *Attorney, Agent, or Firm* — MCGINN I.P. LAW GROUP, PLLC.

(57) ABSTRACT

Provided is a stick turning device capable of turning a stick on which a chain of sausages is suspended while reducing defects in the sausages when delivering the stick from an upstream device to a downstream device. The stick turning device includes a turning arm unit, a turning driving unit, and an actuator unit. The turning driving unit causes the turning arm unit to turn at a predetermined angle around a turning shaft. The actuator unit lifts the turning arm unit such that both ends of the stick are horizontally picked up from the upstream device and the stick is lifted, and such that by bringing the stick close to the turning shaft, a peripheral speed of the stick is reduced with respect to a turning speed of the turning driving unit, and defects in the sausages are reduced, and lowers the stick turned by the turning driving unit.

8 Claims, 6 Drawing Sheets

STICK TURNING DEVICE FOR STICK ON WHICH CHAIN OF SAUSAGES IS SUSPENDED

BACKGROUND OF THE INVENTION

Field of the Invention

The present invention relates to a stick turning device for a stick on which a chain of sausages is suspended, and more particularly to a stick turning device configured to deliver a stick on which a chain of sausages is suspended from an upstream device to a downstream device.

Description of the Related Art

In a sausage production line, first, a sausage filling machine is used to fill a natural casing or an artificial casing, which is a skin portion of the sausage, with a raw material of a sausage and twists the filled casing to form a chain of sausages. Then, the chain of sausages is suspended on a stick by a stick hanging device. A work of hanging the stick on which the sausage is suspended on a cart generally relies on a manual work performed by a worker.

However, the stick on which the chain of sausages is suspended is heavy, and a burden on the worker is heavy. Therefore, a cart hanging device as disclosed in Patent Document 1 has been developed. According to the cart hanging device, a plurality of sticks on which chains of sausages are suspended can be hung on a cart without relying on the manual work performed by the worker. Thereafter, the sausages are sent to subsequent heat treatment and smoke treatment processes, etc.

As disclosed in Patent Document 2, there is also a technique in the related art in which a robot turns a stick on which a ham or a sausage is suspended when the stick is turned and transferred to a subsequent heating device and the like.

CITATION LIST

Patent Document

Patent Document 1: WO 2019/239737
Patent Document 2: EP 2868203A1

However, if the chain of sausages which is manufactured by filling the casing with the raw material and then twisting the filled casing is shaken greatly, in a state before the heat treatment, a twisted portion may twist back, the casing may be easily broken, and an appearance may be deformed, resulting in a defective product. Meanwhile, in order to carry out mass production, it is necessary to carry out a turning process quickly. Therefore, the stick on which the sausage is suspended before the heat treatment particularly needs to be turned carefully and quickly.

The robot in Patent Document 2 has a large size and a large installation area, and performs complicated motions by multiple joints, and thus a robotic device is expensive. Further, in Patent Document 2, a viewpoint that how to turn the stick on which the sausage is suspended while reducing a defect rate of the product is not present, and a risk that the sausage is shaken greatly and twists back, the casing is easily broken, and the appearance is deformed is present.

When a stick hanging device delivers the stick on which the chain of sausages is suspended to the cart hanging device without changing a direction of the stick, a product flow from an upstream device to a downstream device is not straight, and waste occurs in a layout of devices in a factory.

Therefore, it is desired to develop a stick turning device that can reduce a burden on a worker and reduce defects in sausages when a stick on which a chain of the sausages is suspended is delivered from an upstream device to a downstream device while being turned. It is also desired to develop a stick turning device that has a small size and a small installation area, and can be manufactured at a low cost.

In view of such circumstances, the present invention provides a stick turning device that can reduce a burden on a worker and reduce defects in sausages when a stick on which a chain of the sausages is suspended is delivered from an upstream device to a downstream device while being turned. In addition, the present invention provides a stick turning device that has a small size and a small installation area, and can be manufactured at a low cost.

SUMMARY OF THE INVENTION

In order to achieve the objects of the present invention described above, a stick turning device for a stick on which a chain of sausages is suspended according to the present invention may include: a turning arm unit configured to horizontally pick up both ends of the stick on which the chain of sausages is suspended from an upstream device and deliver the stick to a downstream device, and including a pair of arms and stick receiving portions provided at tips of the pair of arms; a turning driving unit configured to turn the turning arm unit at a predetermined angle around a turning shaft in a vertical direction; and an actuator unit configured to lift the turning arm unit such that the both ends of the stick are horizontally picked up from the upstream device and the stick is lifted to a height where the sausages suspended on the stick do not come into contact with the upstream device, and such that by bringing the stick close to the turning shaft, a peripheral speed of the stick is reduced with respect to a turning speed of the turning driving unit, and defects in the sausages due to a centrifugal force of turning by the turning driving unit are reduced, and configured to lower the turning arm unit such that the stick lifted by the turning arm unit turned by the turning driving unit in the lifted state is delivered to the downstream device.

Here, the turning arm unit may sequentially pick up both ends of sticks on which the chains of sausages are suspended from two upstream devices and deliver the sticks to one downstream device.

The turning driving unit may include: a changeable stopper portion configured to allow the turning arm unit to stop at a position where the stick is delivered to the downstream device when the stick is delivered from one of the upstream devices to the downstream device, and allow the turning arm unit to turn to the other upstream device after the stick is delivered to the downstream device; and a stopper receiving portion configured to turn according to the turning of the turning arm unit and abut on the changeable stopper portion in order to stop the turning arm unit at a predetermined stop position.

The changeable stopper portion may include a rack and pinion portion in which a pinion is sandwiched between two racks each having a stopper abutting on the stopper receiving portion and a reciprocal operation is performed.

The turning arm unit may pick up both ends of a plurality of sticks on which chains of sausages are suspended and deliver the sticks to the downstream device.

The turning arm unit may have a dogleg shape in which the pair of arms bends upward respectively.

The actuator unit may lift and lower the turning arm unit by pivoting the turning arm unit around a rotation shaft which is parallel to a line connecting the stick receiving portions at the tips of the pair of arms and perpendicularly intersects the turning shaft of the turning driving unit.

The actuator unit may lower the turning arm unit to an extent that the turning arm unit does not come into contact with the sausages suspended on the stick.

The stick turning device of the present invention has advantages that a burden on a worker can be reduced and defects in the sausages can be reduced when the stick on which the chain of sausages is suspended is delivered from the upstream device to the downstream device while being turned. In addition, there are also advantages that the present invention has a small size and a small installation area, and can be manufactured at a low cost.

By using the stick turning device of the present invention, waste of flow lines in a production line of a factory can be eliminated, and a layout of the devices in the factory can be arranged such that a product flow from the upstream device to the downstream device is in a straight line. Since a turning angle can be freely specified, the devices can be arranged in a desired layout.

DETAILED DESCRIPTION OF THE PREFERRED EMBODIMENTS

Figure 1:
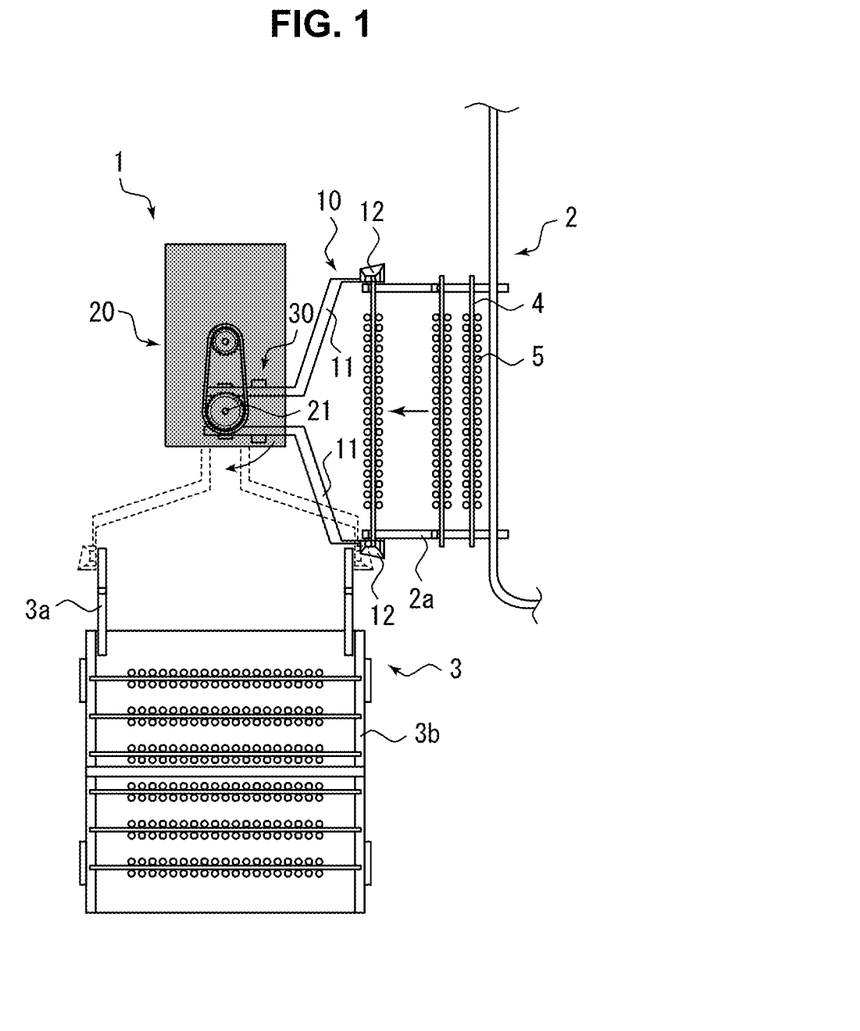
FIG. 1 is a schematic top view for illustrating an overall image of a stick turning device of the present invention.

Hereinafter, embodiments of the present invention will be described with reference to shown examples. FIG. 1 is a schematic top view for illustrating an overall image of a stick turning device for a stick on which a chain of sausages is suspended of the present invention. In the shown example, a stick hanging device 2 is used as an upstream device, a cart hanging device 3 is used as a downstream device, and a stick turning device 1 of the present invention picks up a stick 4 from the stick hanging device 2, turns the stick 4, and delivers the stick 4 to the cart hanging device 3.

A chain of sausages 5 is suspended on the stick 4 by the stick hanging device 2 as the upstream device. More specifically, a sausage filling machine (not shown) fills a natural casing or an artificial casing, which is a skin portion of the sausages, with a raw material of the sausages and twists the filled casing to form the chain of sausages 5, and the stick hanging device 2 suspends the chain of sausages 5 on the stick 4. Thereafter, the stick 4 on which the chain of sausages 5 is suspended stands by at a pair of pick-up arm portions 2a of the stick hanging device 2 in order to be turned. Each of the pick-up arm portions 2a is an arm provided with an inclination on a lower side, and the stick 4 placed on the pick-up arm portions 2a moves to stick receiving positions (tips of the pick-up arm portions 2a) in a direction perpendicular to a longitudinal direction of the stick 4. Any stick hanging device 2 in the related art or developed in the future can be used for the stick turning device 1 of the present invention. The shown example illustrates that the stick hanging device 2 is used as the upstream device, but the present invention is not limited thereto, and the stick hanging device 2 can also be applied to any device that, for example, performs delivery from a conveyor device to another conveyor device, as long as it is a device used when the stick 4 is delivered from an upstream to a downstream by using the stick turning device 1 of the present invention.

The cart hanging device 3 as the downstream device receives the stick 4 on which the chain of sausages 5 is suspended by receiving arm portions 3a, and appropriately hangs a plurality of sticks on a cart 3b. Thereafter, the stick 4, on which the chain of sausages 5 is suspended, hung on the cart 3b is sent to subsequent heat treatment and smoke treatment processes, etc. (not shown). Any cart hanging device 3 in the related art or developed in the future can be used for the stick turning device 1 of the present invention. The shown example illustrates that the cart hanging device is used as the downstream device, but the present invention is not limited thereto, and the cart hanging device can also be applied to any device as long as it is a device used when the stick is delivered from the upstream to the downstream by using the stick turning device 1 of the present invention.

As shown in FIG. 1, the stick turning device 1 of the present invention for delivering such a stick 4 on which the chain of sausages 5 is suspended from the upstream device to the downstream device mainly includes a turning arm unit 10, a turning driving unit 20, and an actuator unit 30.

The turning arm unit 10 includes a pair of arms 11 and stick receiving portions 12. Each of the stick receiving portions 12 is provided at a tip of the arm 11. The stick receiving portions 12 may have a structure that scoops up both ends of the stick 4. Specifically, the stick receiving portions 12 may hook the stick 4 into a U-shaped recess so as to pick up the stick 4. The stick receiving portions 12 may have a structure capable of sandwiching the stick 4 as long as the stick 4 can be picked up. The turning arm unit 10 is used to horizontally pick up the both ends of the stick 4 on which the chain of sausages 5 is suspended from the stick hanging device 2 and deliver the stick 4 to the cart hanging device 3. That is, the turning arm unit 10 picks up the both ends of the stick 4 at the stick receiving portions 12 from the pick-up arm portions 2a of the stick hanging device 2, and delivers the both ends to the receiving arm portions 3a of the cart hanging device 3.

In the shown example, the turning arm unit 10 picks up the both ends of one stick 4 from the stick hanging device 2, but the present invention is not limited thereto. That is, the turning arm unit 10 may pick up a plurality of sticks 4 on which the chains of sausages 5 are suspended and deliver the sticks to the cart hanging device 3.

The turning driving unit 20 causes the turning arm unit 10 to turn at a predetermined angle around a turning shaft 21 in a vertical direction. As shown in FIG. 1, the turning shaft 21 is specifically a shaft in the vertical direction, which exists at root sides of the pair of arms 11 of the turning arm unit 10. The predetermined angle for turning is not particularly limited to a specific angle. In the shown example, the stick 4 is turned by 90 degrees and delivered from the stick hanging device 2 to the cart hanging device 3. In this case, the turning driving unit 20 may cause the turning arm unit 10 to turn by 90 degrees around the turning shaft 21. The turning driving unit 20 may be any one such as a rotary actuator, a stepping motor, and a servomotor, which can cause the turning arm unit 10 to turn at a predetermined angle. In the shown example, the turning shaft 21 is turned by using a motor, a gear, and a chain to turn the turning arm unit 10. A turning angle is specifically described as 90 degrees in the present specification, but the present invention is not limited thereto, and the turning angle can be appropriately changed according to a layout or the like of a production line in a factory.

Figure 2A:
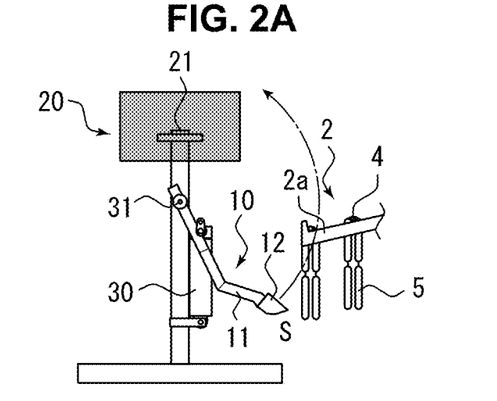
FIGS. 2A, 2B, and 2C are schematic side views for illustrating a lifting operation of a turning arm unit performed by an actuator unit of the stick turning device of the present invention.
Figure 2B:
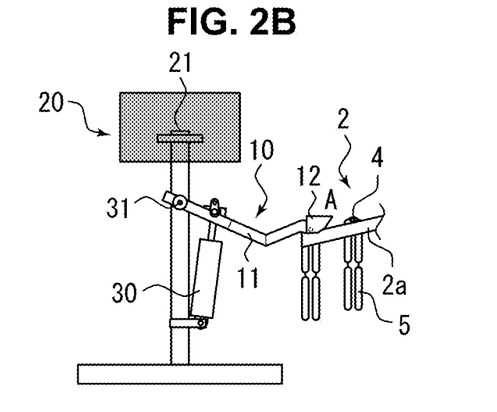
Figure 2C:
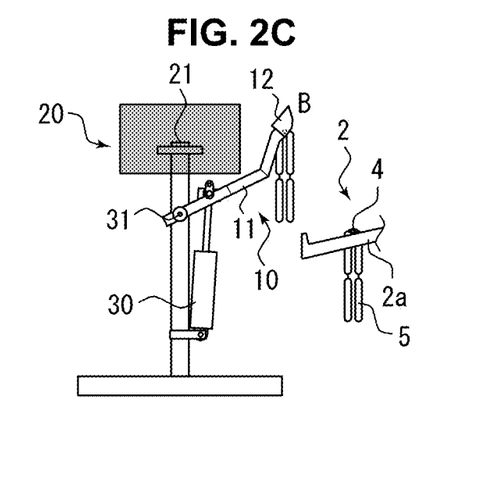

The actuator unit 30 lifts and lowers the turning arm unit 10. Details of the actuator unit 30 will be described by using FIGS. 2A, 2B, and 2C. FIGS. 2A, 2B, and 2C are schematic side views for illustrating a lifting operation of the turning arm unit performed by the actuator unit of the stick turning device of the present invention. FIG. 2A shows a state of the turning arm unit at an initial position, FIG. 2B shows a state in which the turning arm unit is lifted to a position where the stick is picked up, and FIG. 2C shows a state in which the turning arm unit is further lifted and brought to a position close to the turning shaft. In FIGS. 2A, 2B, and 2C, parts having the same reference numerals as in FIG. 1 represent the same objects. In the shown example, the actuator unit 30 uses a pneumatic actuator using a pneumatic cylinder, but the present invention is not limited thereto, anything that can lift and lower the turning arm unit as described below can be used.

The actuator unit 30 lifts the turning arm unit 10 such that the both ends of the stick 4 are horizontally picked up from the stick hanging device 2, and the stick 4 is lifted to a height where the sausages 5 suspended on the stick 4 do not come into contact with the stick hanging device 2. Specifically, as shown in FIGS. 2A and 2B, the actuator unit 30 first lifts the turning arm unit 10 from a position S, which is the initial position, to a position A in order to pick up the stick 4 from the stick hanging device 2. After the stick 4 is picked up by the turning arm unit 10 at the position A, the actuator unit 30 lifts the turning arm unit 10 as it is to a position B (FIG. 2C). The chain of sausages 5 is suspended on the stick 4, which varies depending on a sausage product, and is suspended at a length of about 50 cm to 100 cm. Therefore, when the suspended sausages 5 are lifted from the stick hanging device 2, the actuator unit 30 sufficiently lifts the stick to the height where the sausages 5 suspended on the stick 4 do not come into contact with the stick hanging device 2. In this case, as can be seen from FIG. 2C, the actuator unit 30 of the stick turning device of the present invention lifts the turning arm unit 10 such that the stick 4 is brought close to the turning shaft 21. In the state of the position B shown in FIG. 2C, the turning arm unit 10 is turned by the turning driving unit 20. That is, by bringing the stick 4 close to the turning shaft 21, a peripheral speed of the stick 4 can be decreased with respect to a turning speed of the turning driving unit 20. Accordingly, defects in the sausages 5 due to a centrifugal force of the turning by the turning driving unit 20 can be reduced.

Figure 3A:
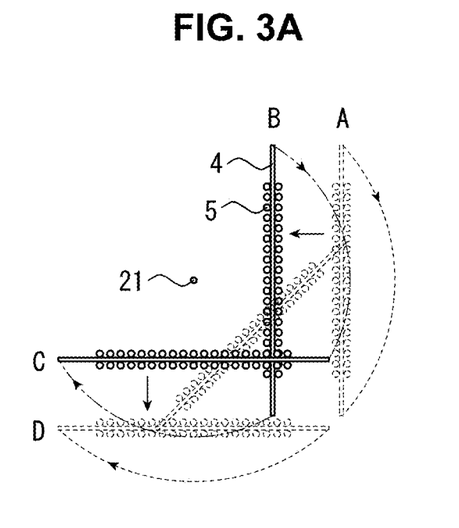
FIGS. 3A and 3B are diagrams for illustrating a relation between lifting of the turning arm unit performed by the actuator unit of the stick turning device of the present invention and decrease in a peripheral speed of a stick with respect to a turning speed of a turning driving unit.

Here, a relation between the lifting of the turning arm unit performed by the actuator unit and the decrease in the peripheral speed of the stick with respect to the turning speed of the turning driving unit will be described with reference to FIGS. 3A and 3B. FIG. 3A is a schematic top view for illustrating movement of the stick by the turning driving unit and the actuator unit of the stick turning device of the present invention. In FIG. 3A, parts having the same reference numerals as in FIG. 1 represent the same objects. As a comparative example, FIG. 3B is a schematic top view for illustrating movement of the stick when an end portion of the stick is turned as a turning shaft.

Figure 3B:
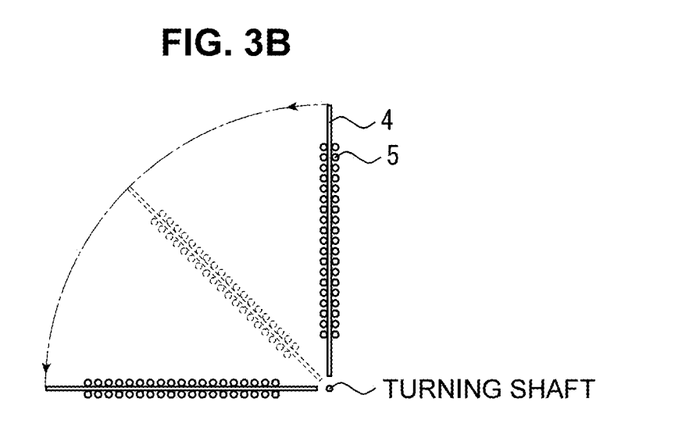

As shown in FIG. 3B, when the stick 4 is turned by 90 degrees around the turning shaft at the end portion of the stick 4 as in the comparative example, a peripheral speed of the sausages 5 near the turning shaft is low, and thus the centrifugal force is small, but for the sausages 5 far from the turning shaft, the peripheral speed becomes high and the centrifugal force becomes large. The sausages 5 suspended on the stick 4 have no problem to some extent when the sausages 5 are shaken uniformly, and when the sausages 5 are shaken non-uniformly, the sausages come into contact with each other, and particularly, the sausages before the heat treatment twist back, the casing is easily broken, and an appearance is deformed. Therefore, when the turning shaft at the end portion of the stick is present as shown in FIG. 3B, it is inevitable that the number of defects will increase.

Meanwhile, as shown in FIG. 3A, in a case of the stick turning device of the present invention, the stick 4 is first picked up from the stick hanging device 2 at the position A. Thereafter, by the actuator unit 30, the stick 4 is lifted to the height where the sausages 5 do not come into contact with the stick hanging device 2, and is lifted while being brought close to the turning shaft 21, and moves to the position B. Accordingly, by bringing the stick 4 close to the turning shaft 21, the peripheral speed of the stick 4 can be decreased with respect to the turning speed of the turning driving unit 20. This is because the peripheral speed is expressed by a product of an angular speed and a radius, and the radius becomes smaller as the stick 4 is brought close to the turning shaft 21. If the stick is turned directly from the position A to a position D, the radius is larger than that when the stick is turned from the position B to the position C, and thus the peripheral speed is also increased. Therefore, the peripheral speed of the stick 4 can be lowered if the stick 4 is turned at the position B where the radius from the turning shaft 21 is smaller. That is, if a driving speed of the turning driving unit 20 is the same, the centrifugal force can be further reduced. When the turning arm unit 10 is turned by 90 degrees by the turning driving unit 20 in this state, the stick moves to the position C with a small centrifugal force. In this way, even if the turning speed of the turning driving unit 20 is the same, by reducing the radius and turning the stick 4 compactly, the centrifugal force can be reduced, and the defects in the sausages 5 due to the turning can be reduced. This is particularly effective, for example, when the plurality of sticks 4 are picked up and delivered to the cart hanging device 3. That is, when the plurality of sticks 4 are picked up, a risk of deformation due to contact between the sausages increases, but the stick turning device of the present invention can turn the stick to an extent that the shaking of the sausages is suppressed, and thus the defects in the sausages can be further reduced. As a result, the turning speed can be increased.

As described above, in the stick turning device 1 of the present invention, not only the turning arm unit 10 is lifted so as to lift the stick 4 to the height where the sausages 5 do not come into contact with the stick hanging device 2, but also the turning arm unit 10 is lifted so as to bring the stick 4 close to the turning shaft 21 in order to decrease the peripheral speed of the stick 4. By such an operation on the turning arm unit 10 performed by the actuator unit 30, the sausages 5 can be delivered from the stick hanging device 2 to the cart hanging device 3 at a high speed while defects in the sausages 5 are reduced.

When the turning shaft is located at a right-angled portion formed by a position where the stick is picked up and a position where the stick is delivered as shown in FIG. 3B, it is necessary to dispose the turning driving unit outside a turning area of the stick. That is, the turning area and the turning driving unit disposed outside the turning area increase an installation area of the entire device. Meanwhile, as can be seen from FIG. 3A, according to the stick turning device of the present invention, the turning shaft that turns the stick by 90 degrees is located inside the right-angled portion formed by the position where the stick is picked up and the position where the stick is delivered. That is, the turning driving unit can be disposed in the turning area. Therefore, the installation area of the stick turning device can be reduced.

Figure 4A:
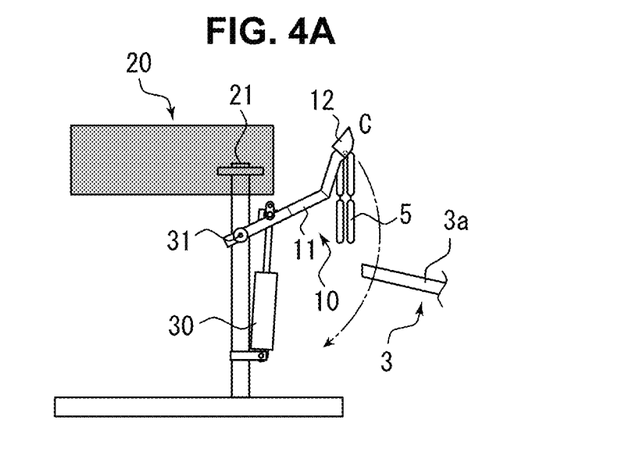
FIGS. 4A, 4B, and 4C are schematic side views for illustrating a lowering operation of the turning arm unit performed by the actuator unit of the stick turning device of the present invention.
Figure 4B:
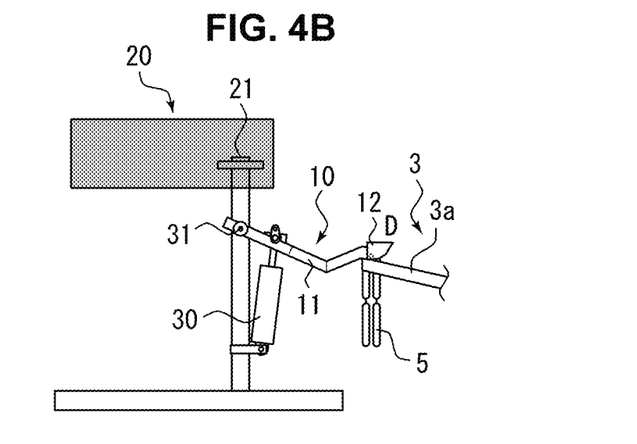
Figure 4C:
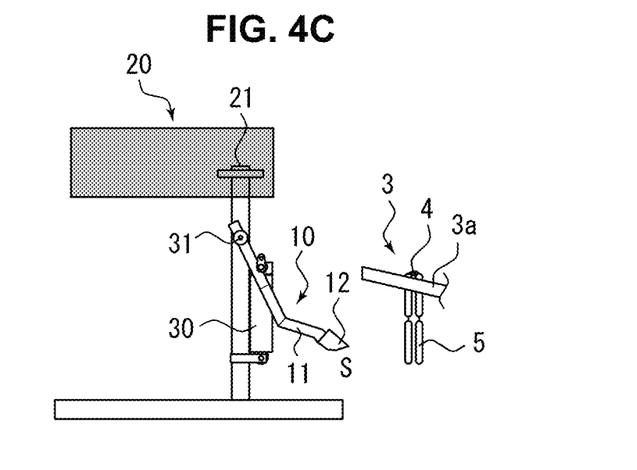

Next, a lowering operation of the turning arm unit performed by the actuator unit of the stick turning device of the present invention will be described with reference to FIGS. 4A, 4B, and 4C. FIGS. 4A, 4B, and 4C are schematic side views for illustrating the lowering operation of the turning arm unit performed by the actuator unit of the stick turning device of the present invention. FIG. 4A shows a state after the turning arm unit is turned, FIG. 4B shows a state in which the turning arm unit is lowered to the position where the stick is delivered, and FIG. 4C shows a state in which the turning arm unit is further lowered to the initial position. In FIGS. 4A, 4B, and 4C, parts having the same reference numerals as in FIG. 1 represent the same objects. The lowering operation of the turning arm unit is basically the same as an operation performed by reversing the lifting operation shown in FIGS. 2A, 2B, and 2C. The actuator unit 30 lowers the turning arm unit 10 such that in a state where the stick 4 is lifted as described above, the stick 4 lifted by the turning arm unit 10 turned by the turning driving unit 20 is delivered to the cart hanging device 3. Specifically, in the state where the actuator unit 30 lifts the turning arm unit 10, the turning arm unit 10 is turned by the turning driving unit 20 and moves to the position C (FIG. 4A). This position C is the position C in FIG. 3A described above in a top view. Thereafter, in order to deliver the stick 4 to the cart hanging device 3, the turning arm unit 10 is lowered to the position D (FIG. 4B). Similarly, this position D is the position D in FIG. 3A described above in a top view. Thereafter, the actuator unit 30 lowers the turning arm unit 10 to the position S which is the initial position (FIG. 4C).

Here, as shown in FIGS. 2A, 2B, 2C, 4A, 4B, and 4C, the initial position S of the turning arm unit 10 is a position where the turning arm unit 10 does not come into contact with the chain of sausages 5 suspended on the stick 4. That is, the actuator unit 30 sufficiently lowers the turning arm unit 10 to a height where the turning arm unit 10 does not come into contact with the sausages 5 suspended on the stick 4. When the turning arm unit 10 is turned again to the position where the stick 4 is picked up from the stick hanging device 2 by turning the turning arm unit 10 in the state of the initial position S, the turning arm unit 10 can be prevented from coming into contact with the sausages 5 suspended on the stick 4 delivered to the cart hanging device 3 and the sausages 5 suspended on the stick 4 waiting to be picked up from the stick hanging device 2.

As shown in FIGS. 2A, 2B, 2C, 4A, 4B, and 4C, the lifting operation that the stick receiving portions 12 are lifted with respect to the turning shaft 21 while moving away from the initial position S, and the stick 4 is picked up from the stick hanging device 2 and then brought close to the turning shaft 21, and the lowering operation that after the turning, the stick receiving portions 12 are lowered while moving away from the turning shaft 21, and returns to the initial position S again after delivering the stick 4 to the cart hanging device 3 can be implemented as follows. That is, when viewed from the position where the stick 4 is picked up or delivered, the stick 4 moves not only in an up-down direction but also in a direction close to the turning shaft 21 for reaching the initial position S and the positions B and C during the turning. The movement can be implemented by turning the turning arm unit 10 around a rotation shaft 31 and moving the stick receiving portion 12 on an arc. That is, the actuator unit 30 may lift and lower the turning arm unit 10 by pivoting the turning arm unit 10 around the rotation shaft 31 which is parallel to a line connecting the stick receiving portions 12 at the tips of the pair of arms 11 and perpendicularly intersects the turning shaft 21 of the turning driving unit.

In this way, the turning arm unit 10 can be turned around the rotation shaft 31 to implement that the turning arm unit 10 is lifted, to the pick-up position A, from the position where the turning arm unit 10 does not come into contact with the sausages 5, namely the initial position S, and further moves close to the turning shaft 21 to the position B during the turning, and after the turning, is lowered to the delivery position D from the position C, and then moves to the initial position S where the turning arm unit 10 does not come into contact with the sausages 5.

The turning arm unit 10 does not need to be complicatedly and stretchably configured as a robot since the turning arm unit 10 only needs to be pivoted around the rotation shaft 31, so that the device can be miniaturized and can be manufactured at a low cost.

As shown in FIGS. 2A, 2B, 2C, 4A, 4B, and 4C, the pair of arms 11 of the turning arm unit 10 may have a dogleg shape in which the pair of arms bends upward respectively. Compared to a straight I-shaped arm, a stress applied to the arms during the lifting operation performed by the actuator unit 30 can be reduced, and a driving force of the actuator unit 30 can be suppressed.

Further, the turning arm unit 10 may be appropriately provided with a suppression plate or the like in order to suppress the shaking of the sausages 5 when the stick 4 is picked up.

The height of the turning arm unit 10 where the stick 4 is picked up and the height of the turning arm unit 10 where the stick 4 is delivered are described as the same heights in FIGS. 2A, 2B, 2C, 4A, 4B, and 4C. That is, the pick-up position A and the delivery position D have the same heights and are exchanged. However, the present invention is not limited thereto, and for example, may be configured that the stick is delivered from the upstream device to the downstream device which are disposed at different heights.

As described above, according to the stick turning device of the present invention, when the stick on which the chain of sausages is suspended is delivered from the upstream device to the downstream device, the turning work of the stick unnecessarily relies on a manual work performed by a worker, and thus a burden on the worker can be reduced. Since the centrifugal force due to the turning can be reduced, the stick can be turned while the defects in the sausages are reduced. In addition, the present invention has a small size, a small installation area, and can be manufactured at a low cost. Since the turning arm unit has a structure controlled only by the turning driving unit and the actuator unit, maintenance is easy. Since the configuration is simple, consumable components are few and running costs are low.

By using the stick turning device of the present invention, waste of flow lines in the production line of the factory can be eliminated, and the layout of the devices in the factory can be arranged such that the product flow from the upstream device to the downstream device is in a straight line. Since the turning angle can be freely specified, the devices can be arranged in a desired layout.

Figure 5:
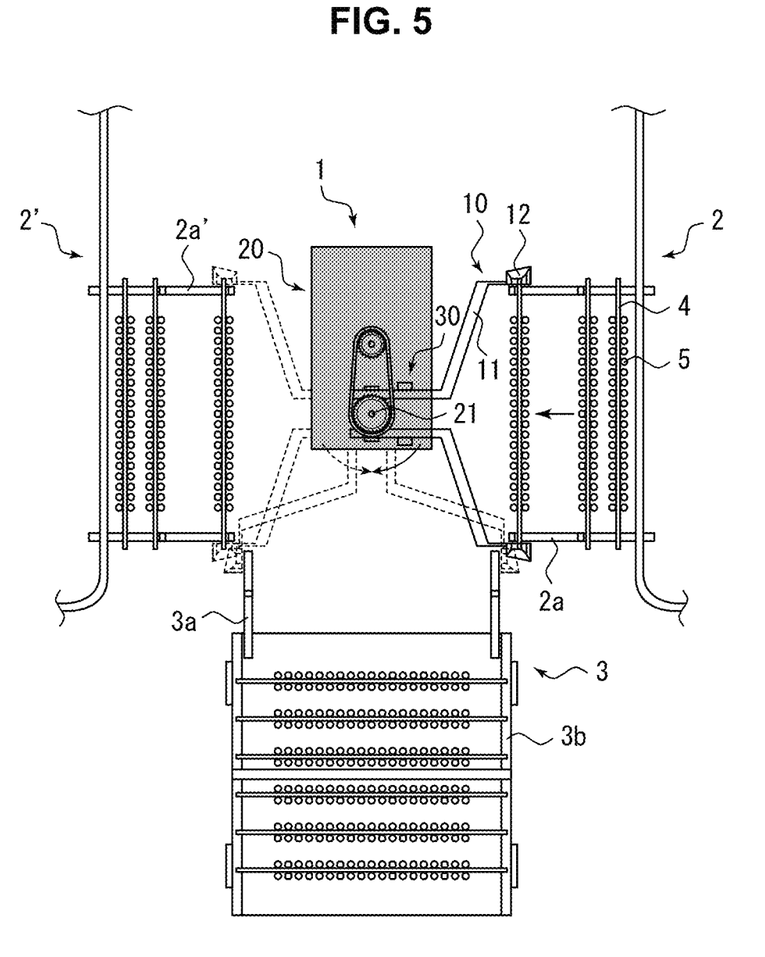
FIG. 5 is a schematic top view for illustrating another example of the stick turning device of the present invention.

Next, another example of the stick turning device of the present invention will be described by using FIG. 5. The above shown example illustrates the stick turning device used when delivering the stick from one upstream device to one downstream device. FIG. 5 is a schematic top view for illustrating an example of the stick turning device of the present invention used when the sticks are delivered from two upstream devices to one downstream device. In FIG. 5, parts having the same reference numerals as in FIG. 1 represent the same objects. As shown in FIG. 5, in the present example, two stick hanging devices 2 and 2', which are the upstream devices, are present in parallel. The sticks 4 sent from the two stick hanging devices 2 and 2' are sequentially delivered to the cart hanging device 3 which is the one downstream device. That is, the stick turning device 1 of the present invention of the shown example improves a processing capacity by using two stick hanging devices in parallel for a work of filling the casing with the raw material, and a work of suspending on the sticks, and delivers the sticks to the one cart hanging device.

Specifically, as shown in FIG. 5, the turning arm unit 10 first picks up both ends of the stick 4 on which the chain of sausages 5 is suspended from the stick hanging device 2 and delivers the stick to the cart hanging device 3. The operation of the turning arm unit 10 in this case is the same as that of the above shown example. That is, the actuator unit 30 is used to horizontally pick up the both ends of the stick 4 from the stick hanging device 2, and to lift the stick 4 to the height where the sausages 5 suspended on the stick 4 do not come into contact with the stick hanging device 2. Further, in a state in which the peripheral speed of the stick 4 is reduced with respect to the turning speed of the turning driving unit 20 by bringing the stick 4 close to the turning shaft 21, the turning arm unit 10 is turned by 90 degrees clockwise by the turning driving unit 20 in the shown example. Accordingly, the defects in the sausages 5 due to the centrifugal force of the turning by the turning driving unit 20 are reduced. Thereafter, the stick 4 lifted by the turning arm unit 10 is delivered to the cart hanging device 3.

Next, in the present example, the turning arm unit 10 is further turned by 90 degrees clockwise to pick up the both ends of the stick 4 on which the chain of sausages 5 is suspended from the stick hanging device 2'. That is, the turning arm unit 10 is configured to turn by 180 degrees. After lifting the stick 4 from the stick hanging device 2', the turning arm unit 10 is turned by 90 degrees counterclockwise in a state where the turning arm unit 10 is lifted, and the turning arm unit 10 is lowered again such that the stick 4 lifted by the turning arm unit 10 is delivered to the cart hanging device 3. The turning angle is specifically described as 90 degrees or 180 degrees in the present specification, but the present invention is not limited thereto, and the turning angle can be appropriately changed according to the layout or the like of the production line in the factory.

As described above, the stick turning device 1 of the present invention may be configured such that the turning arm unit 10 sequentially picks up the both ends of the sticks 4 from the two stick hanging devices 2 and 2' and delivers the sticks 4 to the one cart hanging device 3.

Figure 6A:
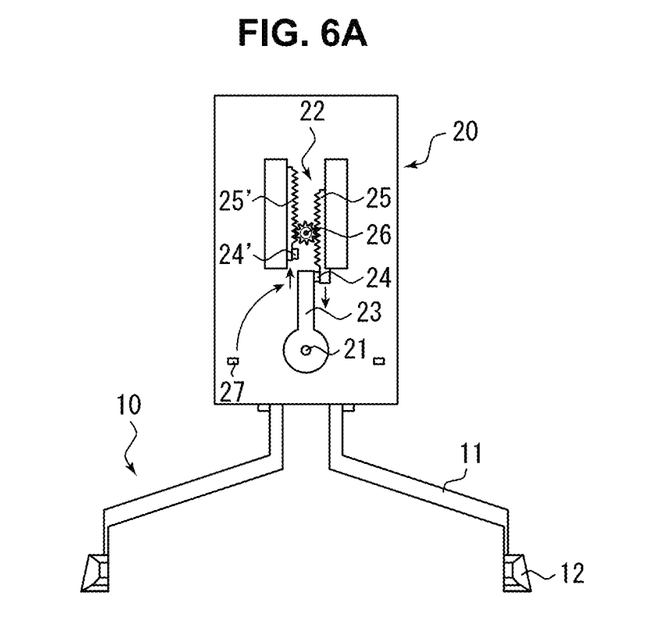
FIGS. 6A and 6B are schematic enlarged top views for illustrating details of the turning driving unit of the stick turning device of the present invention.
Figure 6B:
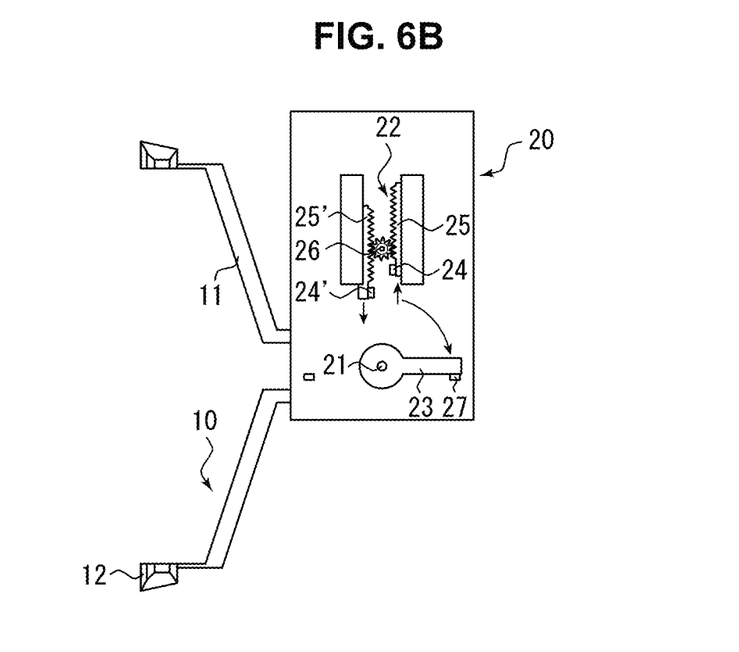

Next, details of the turning driving unit will be described by using FIGS. 6A and 6B. FIGS. 6A and 6B are schematic enlarged top views for illustrating the details of the turning driving unit of the stick turning device of the present invention. FIG. 6A shows a state of the position where the stick is delivered to the cart hanging device, and FIG. 6B shows a state of the position where the stick is picked up from the stick hanging device. In FIGS. 6A and 6B, parts having the same reference numerals as in FIG. 1 represent the same objects. The above shown example illustrates the turning driving unit 20 capable of turning by 180 degrees which is used when delivering the sticks from the two stick hanging devices to the one cart hanging device as shown in FIG. 5. The turning driving unit 20 needs to reliably stop the turning of the turning arm unit 10 at a predetermined stop position. However, the turning driving unit 20 causes the turning arm unit 10 that picks up the stick on which the chain of sausages is suspended to turn, and since a certain amount of heavy objects is turned, it is also necessary to prevent an excessive load on a motor or the like when the turning is stopped. Therefore, in order to stop the turning of the turning arm unit 10 by the turning driving unit 20, for example, the following configuration may be used.

As shown in FIGS. 6A and 6B, the turning driving unit 20 includes a changeable stopper portion 22. The turning driving unit 20 also includes a stopper receiving portion 23 with which the changeable stopper portion 22 abuts. The stopper receiving portion 23 turns in accordance with the turning of the turning arm unit 10, and abuts on the changeable stopper portion 22 in order to stop the turning arm unit 10 at the predetermined stop position. Specifically, the stopper receiving portion 23 of the shown example extends to a side opposite to a stick receiving portion 12 side of the turning arm unit 10, and turns around the turning shaft 21 integrally with the turning arm unit 10.

In the shown example, the changeable stopper portion 22 includes a rack and pinion portion. Specifically, the rack and pinion portion, which constitutes the changeable stopper portion 22, performs a reciprocal operation by sandwiching a pinion 26 between two racks 25 and 25' which include stoppers 24 and 24', respectively, and the stopper receiving portion 23 abuts on the stoppers 24 and 24'. The changeable stopper portion 22 operates such that when the stick is delivered from one of the stick hanging devices to the cart hanging device, the rack 25 is extended and the stopper receiving portion 23 abuts on the stopper 24 such that the turning arm unit 10 can be stopped at the position where the stick is delivered to the cart hanging device (FIG. 6A). Accordingly, the turning of the turning arm unit 10 by the turning driving unit 20 can be accurately stopped at a correct position. Next, after the stick is delivered to the cart hanging device, the rack 25 is pulled back such that the turning arm unit 10 can turn to the other stick hanging device. In this case, the rack 25' is extended due to the reciprocal operation to prepare for a next delivery operation to the cart hanging device. In this case, the turning arm unit 10 is configured to turn by 180 degrees and can be stopped at a predetermined position by changing the stoppers 24 and 24' by the changeable stopper portion 22. In the shown example, abutting portions 27 are provided such that the turning arm unit can also be stopped at the pick-up position. The stopper receiving portion 23 abuts on the abutting portions 27 such that the turning arm unit 10 stops at a position where the stick is picked up from the other stick hanging device. The abutting portions 27 are respectively provided on left and right sides such that the turning arm unit can be stopped at the positions where the sticks are picked up from the two stick hanging devices. The abutting portion 27 does not need to be changeable because the turning arm unit 10 does not turn any more.

As described above, the turning driving unit 20 may have a configuration in which the changeable stopper portion 22 is used to stop at the predetermined stop position such that the turning arm unit 10 picks up the stick from one of the stick hanging devices, delivers the stick to the cart hanging device, and then is turned to the other stick hanging device to pick up the stick and deliver the stick to the cart hanging device again. The changeable stopper portion used in the turning driving unit of the stick turning device of the present invention is not limited to the one including the rack and pinion portion as in the shown example, and may be any one as long as it can stop at a predetermined position.

The stick turning device for the stick on which the chain of sausages is suspended of the present invention is not limited to the above shown examples, and of course, various changes can be made without departing from the gist of the present invention.

What is claimed is:

1. A stick turning device configured to deliver a stick on which a chain of sausages is suspended from an upstream device to a downstream device, the stick turning device comprising:
   a turning arm unit configured to horizontally pick up both ends of the stick on which the chain of sausages is suspended from the upstream device and deliver the stick to the downstream device, and including a pair of arms and stick receiving portions provided at tips of the pair of arms;
   a turning driving unit configured to turn the turning arm unit at a predetermined angle around a turning shaft in a vertical direction; and
   an actuator unit configured to lift the turning arm unit such that the both ends of the stick are horizontally picked up from the upstream device and the stick is lifted to a height where the sausages suspended on the stick do not come into contact with the upstream device, and such that by bringing the stick close to the turning shaft, a peripheral speed of the stick is reduced with respect to a turning speed of the turning driving unit, and defects in the sausages due to a centrifugal force of turning by the turning driving unit are reduced, and configured to lower the turning arm unit such that the stick lifted by the turning arm unit turned by the turning driving unit in the lifted state is delivered to the downstream device.

2. The stick turning device according to claim 1, wherein the turning arm unit sequentially picks up both ends of sticks on which chains of sausages are suspended from two upstream devices and delivers the sticks to one downstream device.

3. The stick turning device according to claim 2, wherein the turning driving unit includes:
   a changeable stopper portion configured to allow the turning arm unit to stop at a position where the stick is delivered to the downstream device when the stick is delivered from one of the upstream devices to the downstream device, and allow the turning arm unit to turn to the other upstream device after the stick is delivered to the downstream device; and
   a stopper receiving portion configured to turn according to the turning of the turning arm unit and come into contact with the changeable stopper portion in order to stop the turning arm unit at a predetermined stop position.

4. The stick turning device according to claim 3, wherein the changeable stopper portion includes a rack and pinion portion in which a pinion is sandwiched between two racks each having a stopper abutting on the stopper receiving portion and a reciprocal operation is performed.

5. The stick turning device according to claim 1, wherein the turning arm unit picks up both ends of a plurality of sticks on which chains of sausages are suspended and delivers the sticks to the downstream device.

6. The stick turning device according to claim 1, wherein the turning arm unit has a dogleg shape in which the pair of arms bends upward respectively.

7. The stick turning device according to claim 1, wherein the actuator unit lifts and lowers the turning arm unit by pivoting the turning arm unit around a rotation shaft which is parallel to a line connecting the stick receiving portions at the tips of the pair of arms and perpendicularly intersects the turning shaft of the turning driving unit.

8. The stick turning device according to claim 1, wherein the actuator unit lowers the turning arm unit to an extent that the turning arm unit does not come into contact with the sausages suspended on the stick.

* * * * *